US012761908B2

(12) United States Patent
Bhavana et al.

(10) Patent No.: US 12,761,908 B2
(45) **Date of Patent: *Oct. 13, 2026**

(54) GENERATIVE ARTIFICIAL INTELLIGENCE ("AI") FOR DEVELOPMENT TASK FEEDBACK SYSTEM

(71) Applicant: Bank of America Corporation, Charlotte, NC (US)

(72) Inventors: Ramesh Bhavana, Plano, TX (US); Rajneesh Acharya, Princeton Junction, NJ (US); Gaurav Mongia, Hyderabad Telangana (IN); Daniel E. Bartlett, Charlotte, NC (US); Ramakrishna Yannam, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 250 days.

This patent is subject to a terminal disclaimer.

(21) Appl. No.: 18/794,178

(22) Filed: Aug. 5, 2024

(65) Prior Publication Data

US 2026/0037254 A1 Feb. 5, 2026

(51) Int. Cl.
*G06F 8/70* (2018.01)
*G06F 11/3604* (2025.01)

(52) U.S. Cl.
CPC ............ *G06F 8/70* (2013.01); *G06F 11/3604* (2013.01)

(58) Field of Classification Search
CPC . G06F 8/60–75; G06F 11/36; G06N 3/08–09; G06N 20/00
See application file for complete search history.

(56) References Cited

U.S. PATENT DOCUMENTS

| | | | | |
|---|---|---|---|---|
| 10,635,409 | B2 * | 4/2020 | Pradhan | G06N 3/0499 |
| 11,042,369 | B1 * | 6/2021 | Kimball | G06F 11/302 |
| 11,610,173 | B2 * | 3/2023 | Sanchez | G06F 8/75 |
| 2024/0338638 | A1 * | 10/2024 | Duggal | G06Q 10/06398 |

* cited by examiner

*Primary Examiner* — Duy Khuong T Nguyen
(74) *Attorney, Agent, or Firm* — Weiss & Arons LLP

(57) ABSTRACT

Methods for harnessing GenAI to provide dynamic feedback to developers are provided. Methods may receive processed data elements. Each data element may include two or more iterations of a software element generated by a developer, and a feedback document generated by a tester in response to receiving the software element. Methods may train an LLM with the data elements. The LLM may operate with an AI feedback engine. Methods may receive a software element created by a developer. Methods may push the software element to the engine. Methods may assess the software element at the engine to generate the feedback document. The feedback document may include comments, modifications and/or a quality index. Methods may provide the feedback document to the developer. The developer may override the feedback document. Upon receipt of an override, the engine may send an unedited version of the software element to publication.

15 Claims, 8 Drawing Sheets

GENERATIVE ARTIFICIAL INTELLIGENCE ("AI") FOR DEVELOPMENT TASK FEEDBACK SYSTEM

FIELD OF TECHNOLOGY

Aspects of the disclosure relate to software development.

BACKGROUND OF THE DISCLOSURE

Software development involves creating and maintaining software for computing devices. Software development involves project conception, evaluation of project feasibility, business requirements analysis, software design, software programming, software testing, software release and software maintenance.

Software development typically involves sequencing, where a first step is completed before a second step is initiated. Iterative development methods include an application development lifecycle. An application development lifecycle is a process for planning, creating, testing and deploying an information system. Typical application development lifecycle includes six stages, i.e., requirement analysis, design, development and testing, implementation, documentation and evaluation.

During software development, a user may write a story. A story, also referred to as a user story, may be a paragraph that identifies a functional or technical description of a system behavior. During software development, a user may write a code segment. During software development, a user may write a test case. During software development, a user may perform any other suitable software development task within the application development lifecycle.

The written story, code segment or test case may be sent to a quality assurance team, where human operators review the written story, code segment or test case. The human operators provide responses to the software developer. The software developer then revises the written story, code segment or test case based on the feedback provided by the human operator. This iterative process between the software developer and the human operator is both time consuming and inconsistent.

The human operator may use various rules to rate/mark the written story, code segment or test case. However, each human operator may view the rating guidelines using a different lens. Therefore, the end result may be inconsistent.

Furthermore, a rules-based approach may provide limited feedback to the writer because the software element either complies with the rules or fails to comply with the rules. Yet further, the response time for a human operator to provide feedback to a developer may be on the order of hours, weeks or months.

Moreover, in order to achieve a high-quality software element which complies with all or most of the rules, there may be as many as three or four iterations of the developer creating and revising the software element and the human operator providing feedback.

As such, it would be desirable to harness generative AI to create a system to provide dynamic feedback to developers in real-time. It would be further desirable for the system to auto-publish such stories, segments, etc. that rate above a predetermined threshold.

SUMMARY OF THE DISCLOSURE

Systems, apparatus and methods for harnessing generative artificial intelligence ("GenAI") to provide dynamic feedback are provided. Methods may include providing dynamic feedback to developers and any other suitable users.

Methods may include receiving a plurality of processed data elements. Each processed data element, included in the plurality of processed data elements, may include one or more iterations of software development generated by a developer. Each processed data element may also include a feedback document generated by a tester in response to receiving the software element. Other suitable iteration counts such as two, three, four, may also be included.

The software element may be a story. The software element may be a code segment. The software element may be a test case.

A story, also referred to as a user story, may be a paragraph that identifies a functional or technical description of a system behavior. A format for stories may include a persona, a requirement and a goal. Stories may include the following portions: As a-fill in the blank-, I need-fill in the blank- and so that-fill in the blank-. An example of a story may include the following: As Jennifer (Jennifer being a persona to which a technical team can relate), I need to be able to perform transfers via the web application, so that I can transfer funds while I am in transit. Another example of a story may include the following: As a user requesting authentication for location authentication, I need to be able to authenticate via my smartwatch, so that I can enter the building without removing an authentication device from my belongings.

Stories may also be written in other formats. For example, a story may include: We need to extend the authentication code in our security services layer to include two-factor authentication.

A code segment may be a portion of code. The code may be source code, configuration files or any other suitable code.

A test case may include a specification of inputs, execution conditions, testing procedure and expected results. The test case may be used to test a software product.

Methods may include training a large language model ("LLM"). The large language model may operate in tandem with an artificially intelligent feedback machine. The large language model may be fed a plurality of processed data elements.

Methods may include enabling a first developer to create a software element. Methods may include pushing or otherwise transmitting the software element to the artificially intelligent feedback engine.

The artificially intelligent feedback engine may assess, review and/or analyze the software element. The assessment, review and/or analysis may include using the large language model operating in tandem with the artificially intelligent feedback engine to generate a feedback document for the software element.

Methods may include providing the feedback document to the first developer. The feedback document may include one or more comments on the software element. The feedback document may include one or more modifications for the software element. The feedback document may include a quality index for the software element. The quality index may be based on the large language model's assessment of the software element. As such, the quality index may consider a number of possible modifications, a number of possible comments, a number of significant comments and/or a number of significant modifications.

Methods may include enabling the first developer to override the feedback document. Methods may include enabling the first developer to send an unedited version of the software element to publication. The unedited version of the software element may be absent incorporation of the one or more comments and/or one or more modifications.

Methods may include continually harvesting updates to correspondence between different entity levels regarding issues with publication of software elements. Methods may include continually updating the large language model with the updates.

The quality index may score above a first threshold. When the quality index scores above a first threshold, methods may enable the first developer to override the feedback document. When the quality index scores above the first threshold, methods may include sending an unedited version of the software element to publication. The unedited version of the software element may be absent incorporation of the one or more comments and/or the one or more modifications.

The quality index may score below the first threshold and above a second threshold. When the quality index scores below the first threshold and above a second threshold, methods may include enabling the first developer to override the feedback document and push the software element for publication. When the quality index scores below the first threshold and above the second threshold, methods may include modifying the software element and pushing the software element for publication. Pushing the software element for publication may involve posting the software element to a software layer from which software elements are published.

The quality index may score below the second threshold. When the quality index scores below the second threshold, methods may include disabling publishing the software element. When the quality index scores below the second threshold, methods may include forcing incorporation of one or more of the one or more comments and/or one or more of the revisions prior to sending the software element for publication.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
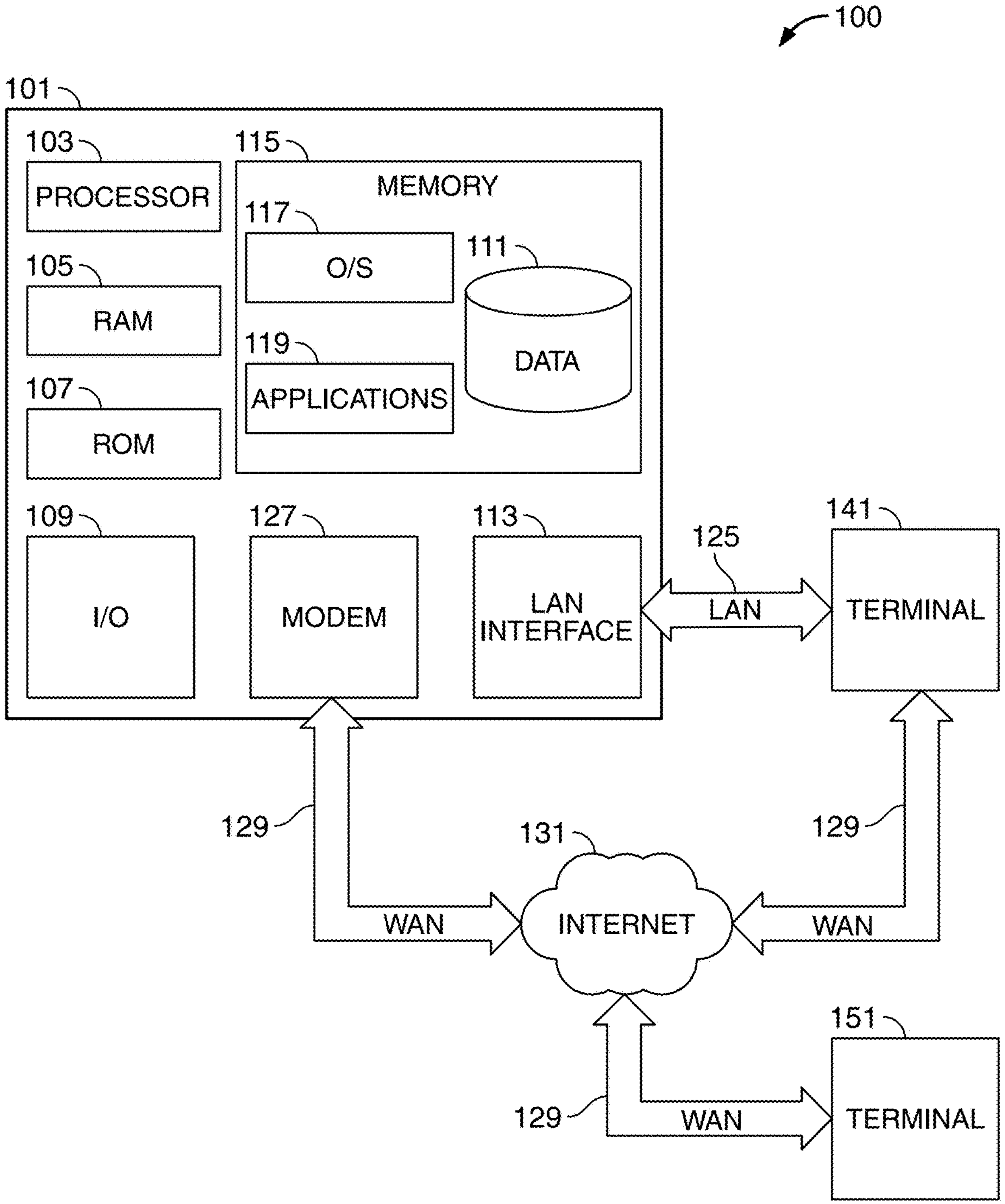
FIG. 1 shows an illustrative diagram in accordance with principles of the disclosure.

Apparatus, methods and systems for harnessing generating artificial intelligence to provide dynamic feedback to developers are provided. The system may include an artificial intelligence engine operating in tandem with a large language model. The system may include a software development user interface.

The artificially intelligent engine may operate in tandem with a large language model. The large language model may be trained on a plurality of processed data elements. Each processed data element may include one or more iterations (such as, two, three, four or any other suitable number) of a software element generated by a developer. Each processed data element may also include a feedback document generated by a tester in response to receiving the software element.

The software development user interface may enable a developer to create a software element, send a software element for review and/or publish the software element.

The artificially intelligent feedback engine may intercept a software element sent for review. The artificially intelligent feedback engine may assess the software element using the large language model to generate a feedback document for the software element.

The artificially intelligent feedback engine may provide the feedback document to the developer via the software developer user interface. The feedback document may include one or more comments on the software element. The feedback document may include one or more modifications for the software element. The feedback document may include a quality index for the software element.

Upon receipt of the feedback document at the software development user interface, the artificially intelligent feedback engine may enable the first developer to override the feedback document. Upon receipt of the feedback document at the software developer user interface, the artificially intelligent feedback engine may send an unedited version of the software element to publication. The unedited version of the software element may be absent incorporation of the one or more comments and/or one or more modifications.

Upon receipt of the feedback document at the software development user interface, the artificially intelligent feedback engine may perform one or more actions based on the score of the quality of index. When the quality index is above a first threshold, the first developer may be enabled to override the feedback document. When the quality index is above the first threshold, the first developer may also be enabled to send an unedited version of the software element to publication. The unedited version of the software element may be absent incorporation of the one or more comments and/or the one or more modifications.

When the quality index is below the first threshold and above a second threshold, the first developer may be enabled to override the feedback document and push the software element for publication. When the quality index is below the first threshold and above a second threshold, the first developer may be enabled to modify the software element and push the software element for publication. When the quality index is below the first threshold and above a second threshold, the first developer may be enabled to modify the software element and push the software element for an additional assessment by the artificially intelligent feedback engine.

When the quality index is below a second threshold, the first developer may be disabled from publishing the software element. When the quality index is below the second threshold, the first developer may be forced, via the user interface, to incorporate one or more of the one or more comments and/or one or more revisions prior to sending the software element for publication. Publication of the software element may include posting the software element to a production environment.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the user telephones, mobile devices, user devices, databases and any other part of the disclosure may include some or all of apparatus included in system 100.

Computer 101 may have a processor 103 for controlling the operation of the device and its associated components and may include Random Access Memory ("RAM") 105, Read Only Memory ("ROM") 107, input/output circuit 109 and a non-transitory or non-volatile memory 115. Machine-readable memory may be configured to store information in machine-readable data structures. The processor 103 may also execute all software executing on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of the system 100. Memory 115 may also store videos, text and/or audio assistance files. nodes, servers, computing devices, User telephones, user devices, databases and any other suitable computing devices as disclosed herein may have one or more features in common with Memory 115. The data stored in Memory 115 may also be stored in cache memory, or any other suitable memory.

Input/output ("I/O") module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. When used in a LAN networking environment, computer 101 is connected to LAN 125 through a LAN interface or adapter 113. When used in a Wide Area Network ("WAN") networking environment, computer 101 may include a modem 127 or other means for establishing communications over WAN 129, such as Internet 131. Connections between System 100 and Terminals 151 and/or 141 may be used for the communication between different nodes and systems within the disclosure.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be configured to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS") and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with data 111 and any other suitable information, may be stored in memory 115. One or more of applications 119 may include one or more algorithms that may be used to implement features of the disclosure comprising the transmission, storage, and transmitting of data and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminal 151 and/or terminal 141 may be one or more data sources or a calling source. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
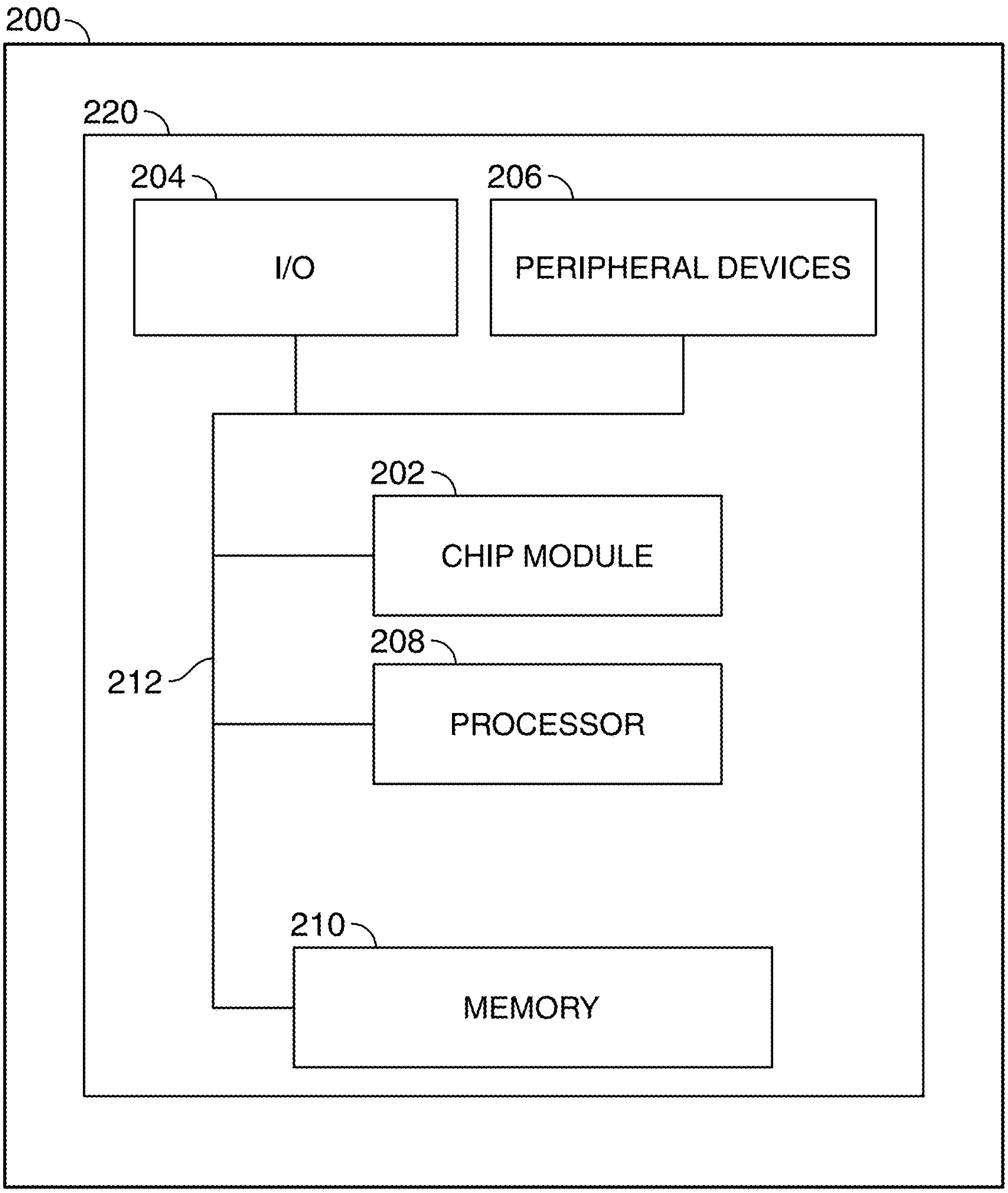
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
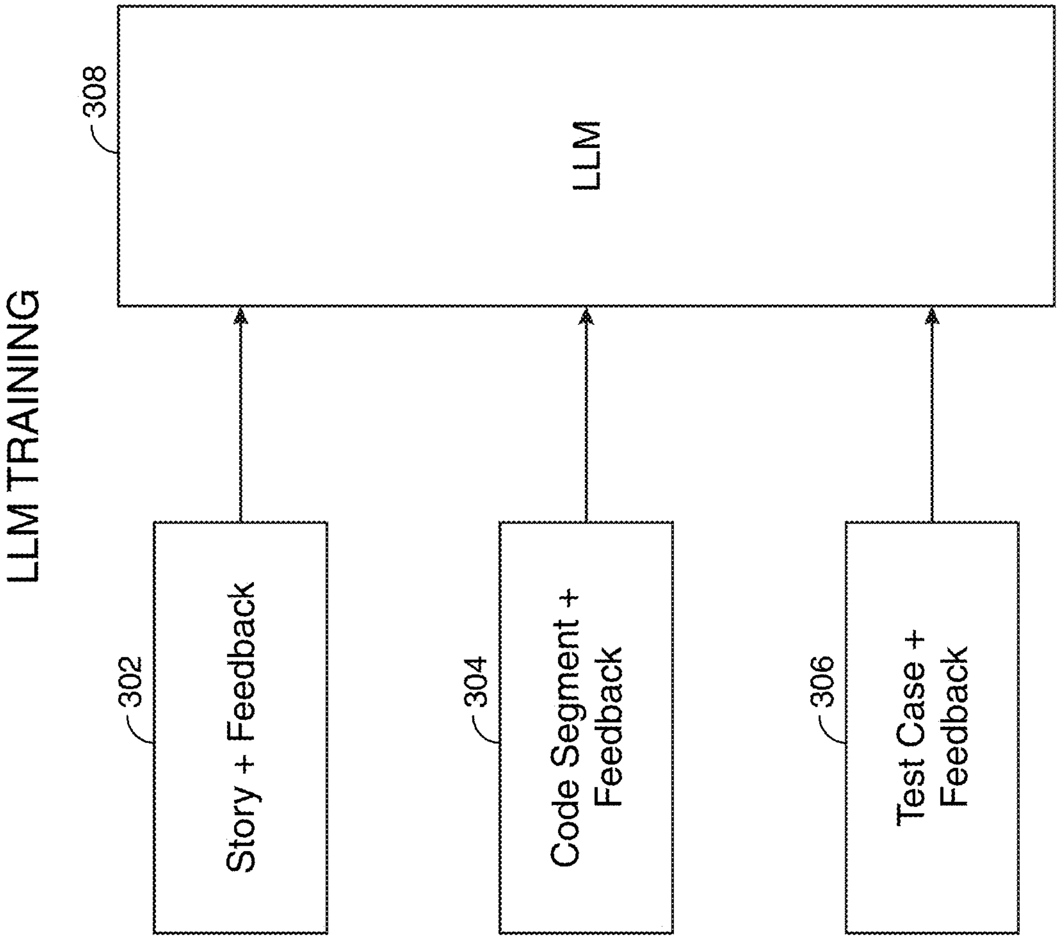
FIG. 3 shows yet another illustrative diagram in accordance with principles of the disclosure.

FIG. 3 shows an illustrative diagram. The illustrative diagram shows training LLM 308. In order to learn how to appropriately provide feedback to a software element, the LLM may be fed various software elements and manual feedback previously generated. Examples of software elements may be shown at 302 (story plus feedback), 304 (code segment plus feedback) and 306 (test case plus feedback).

Figure 4:
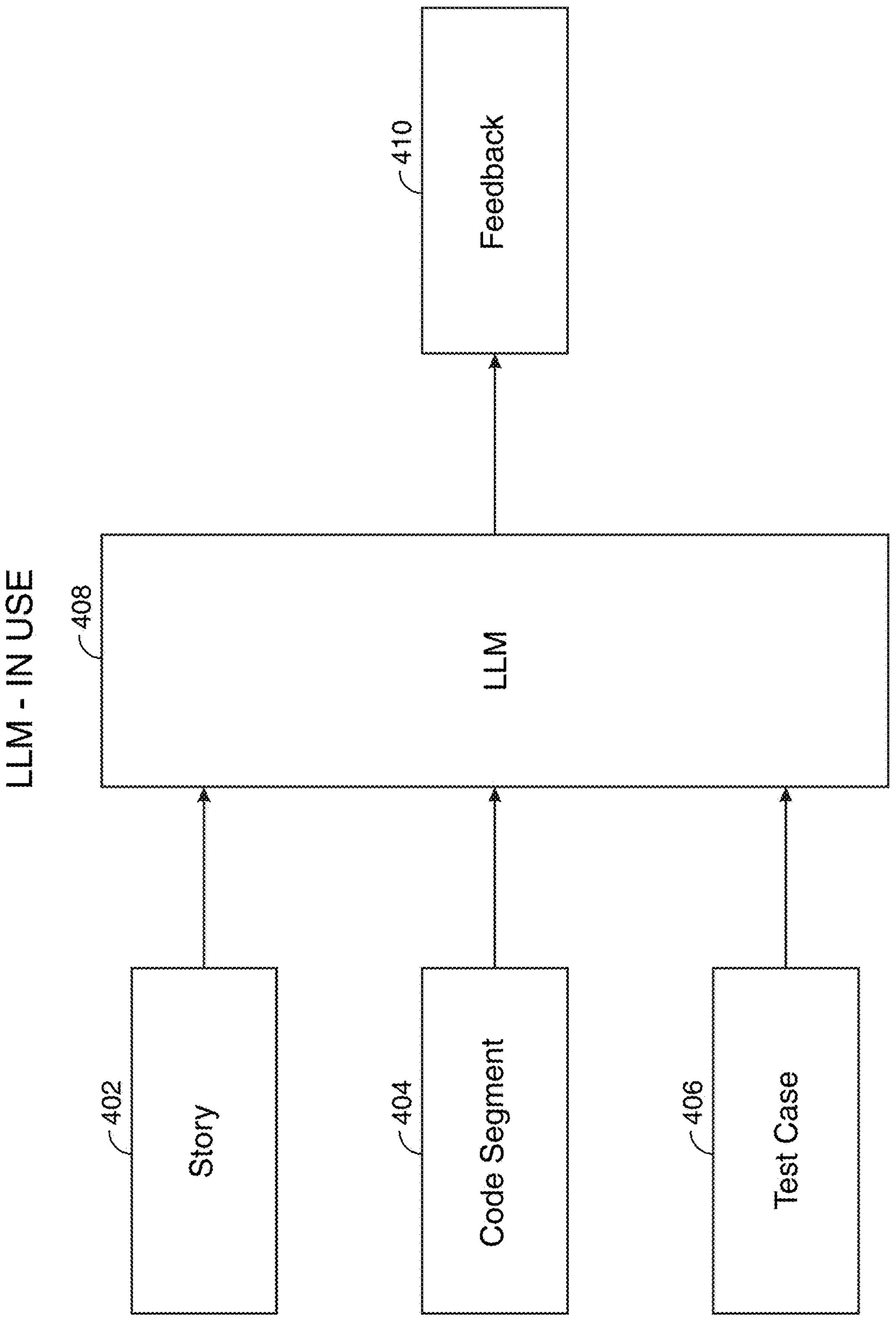
FIG. 4 shows still another illustrative diagram in accordance with principles of the disclosure.

FIG. 4 shows an illustrative diagram. The illustrative diagram shows in-use LLM 408. While in use, LLM 408 may receive software elements, such as, for example story 402, code segment 404 and test case 406. Feedback documents may be generated by LLM 408. LLM 408 may output a feedback document for each input software element. Feedback 410 shows an exemplary output feedback document.

Figure 5:
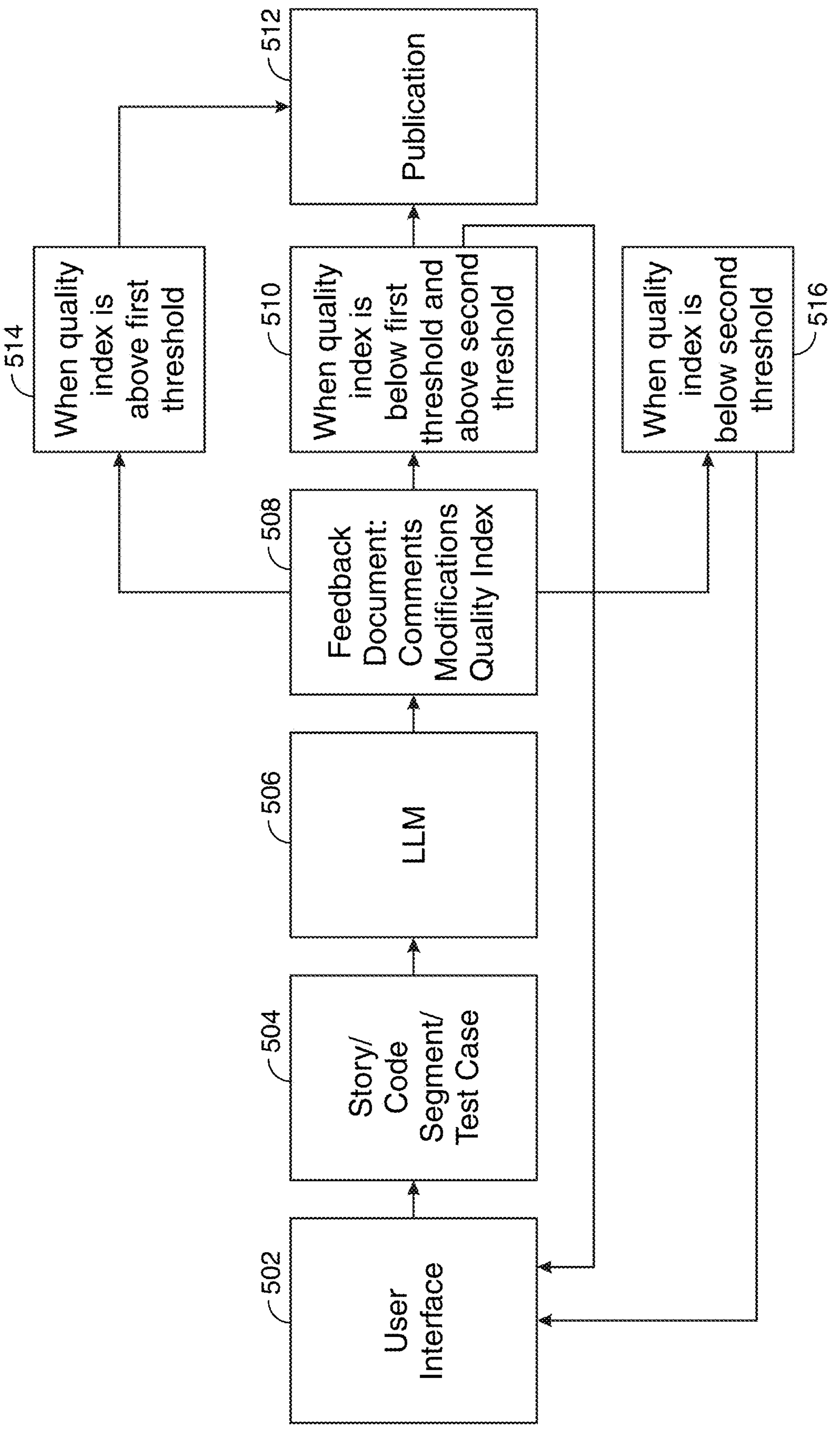
FIG. 5 shows an illustrative flow chart in accordance with principles of the disclosure.

FIG. 5 shows an illustrative flow chart. At 502, a user, such as developer may operate on a user interface. The user interface may be any suitable user interface, for example a project management user interface, a code editor user interface, a word processor or any other suitable user interface.

A user may create a software element using the user interface. The software element may be a story, a code segment, a test case or any other suitable software element, as shown at 504.

The software element may be transmitted to a trained LLM, as shown at 506. The trained LLM may create a feedback document, as shown at 508. The feedback document may include comments on the software element. The feedback document may include modifications to the feedback document. The feedback document may include a quality index. The quality index may measure the quality of the software element. It should be noted that, at times, a specific set of rules may not be used to determine the quality of the software element. Rather, a comparison of the software element to data included in the LLM may provide the quality index.

When the quality index is above a first threshold, as shown at 514, the software element may be transmitted to publication, as shown at 512. At times, publication of the software element may be absent any interaction with the user that submitted the software element.

When the quality index is below a first threshold and above a second threshold, as shown at 510, the software element may be transmitted to the user interface for modifications, or the software element may be transmitted for publication. The developer may be able to select whether to revise the software element or override the feedback provided by the LLM and transmit the software element to publication.

When the quality index is below a second threshold, as shown at 516, the software element may be transmitted to the user interface for modification. The developer may be prevented from pushing the software element to publication.

Figure 6:
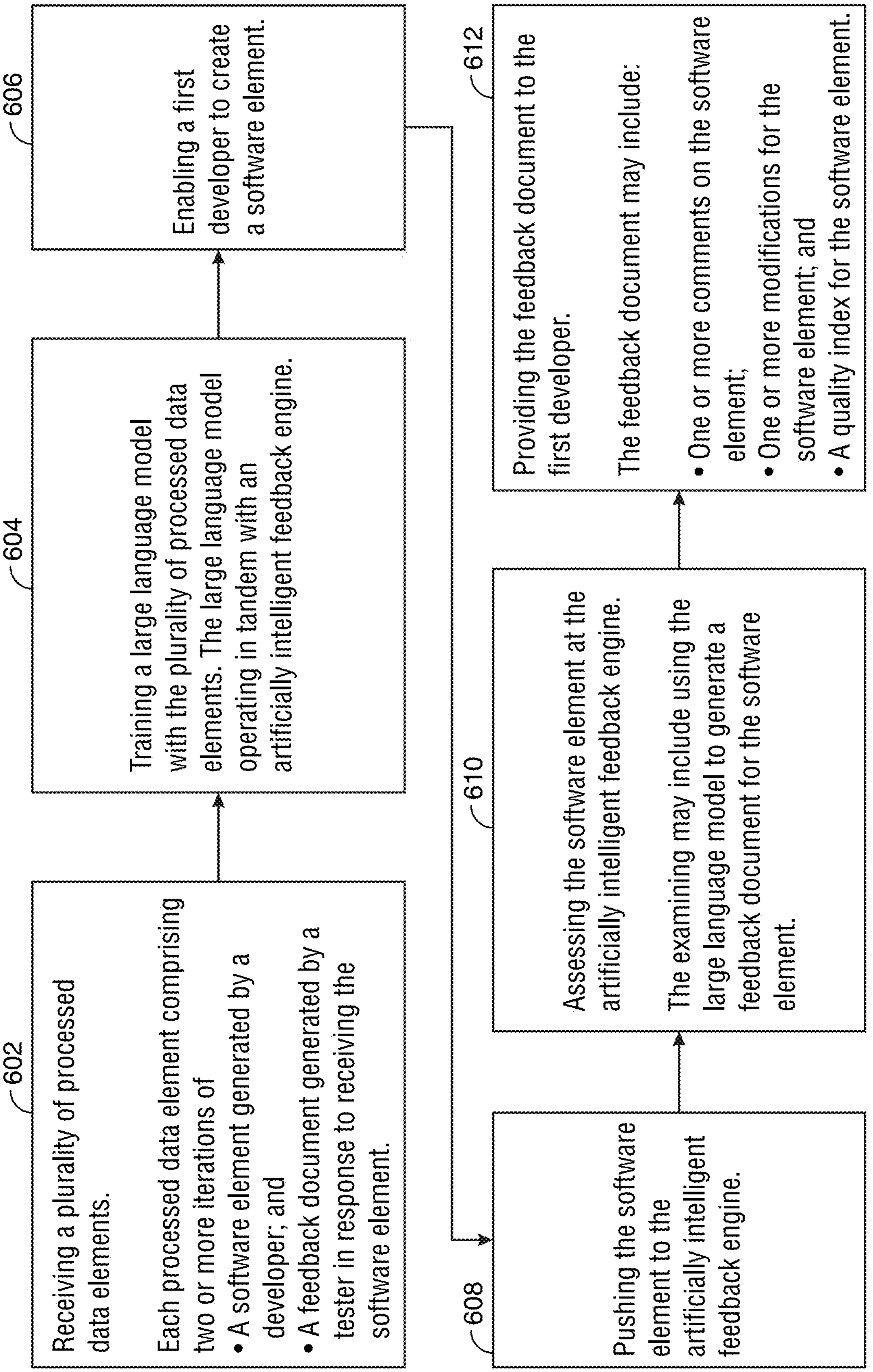
FIG. 6 shows another illustrative flow chart in accordance with principles of the disclosure.

FIG. 6 shows an illustrative flow chart. Step 602 shows receiving a plurality of processed data elements. Each of the processed data elements may include two or more iterations of a software element generated by a developer. Each of the processed data elements may include two or more iterations of a feedback document generated by a tester in response to receiving the software element.

Step 604 shows training a large language model with the plurality of processed data elements. The large language model may operate in tandem with an artificially intelligent feedback engine.

Step 606 shows enabling a first developer to create a software element.

Step 608 shows pushing the software element to the artificially intelligent feedback engine.

Step 610 shows assessing the software element at the artificially intelligent feedback engine. The assessment may include using the LLM to generate a feedback document for the software element.

Step 612 shows providing the feedback document to the first developer. The feedback document may include one or more comments on the software element. The feedback document may include one or more modifications for the software element. The feedback document may include a quality index for the software element.

Figure 7:
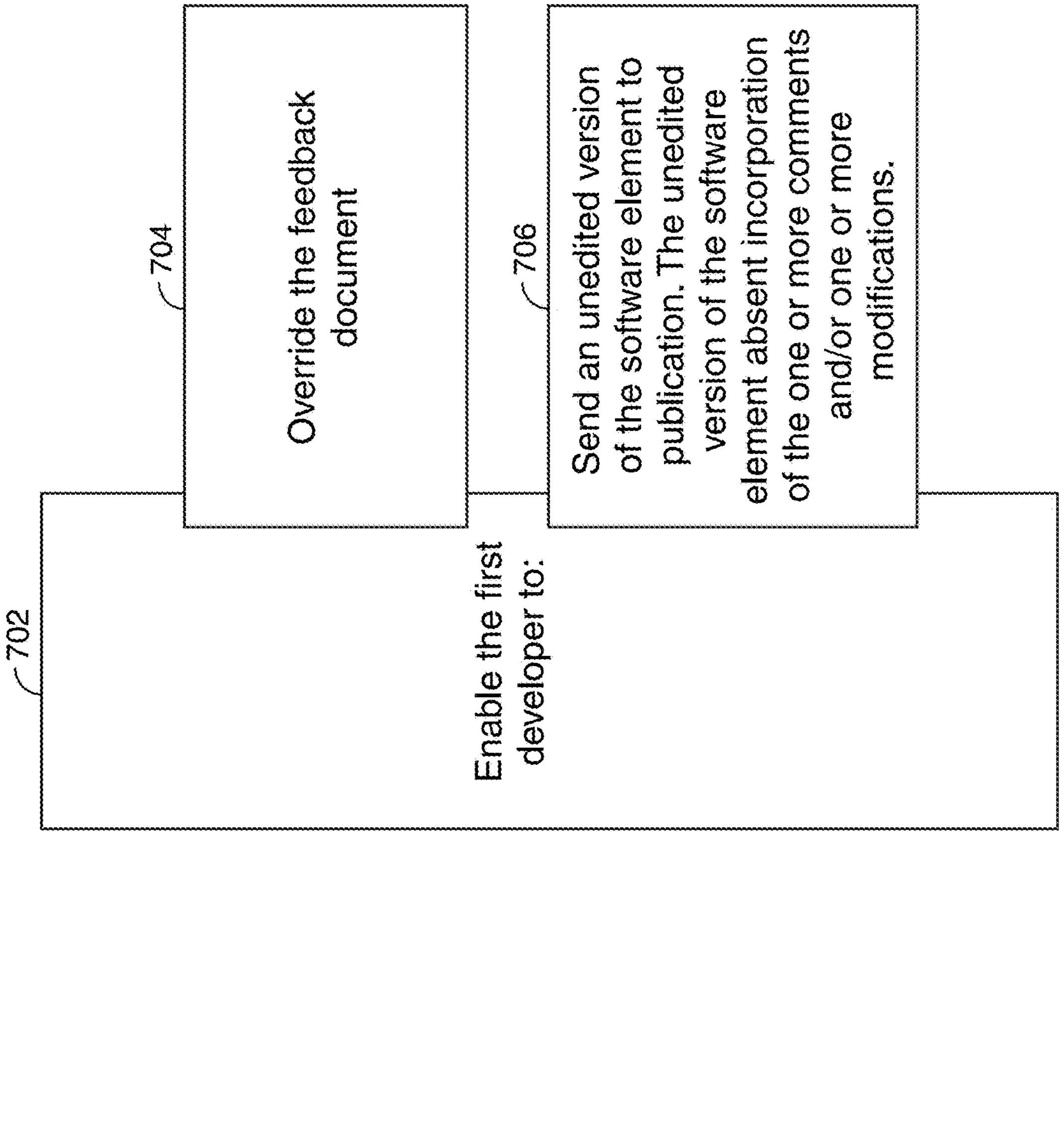
FIG. 7 shows yet another illustrative flow chart in accordance with principles of the disclosure.

FIG. 7 shows an illustrative flow chart. The illustrative flow chart shows following receipt of a feedback document, a first developer is enabled to execute one or more tasks, as shown at 702. The tasks may include overriding the feedback document, as shown at 704. The tasks may include sending an unedited version of the software element to publication, as shown at 706. The unedited version of the software element may be absent information of the one or more comments and/or one or more modifications.

Figure 8:
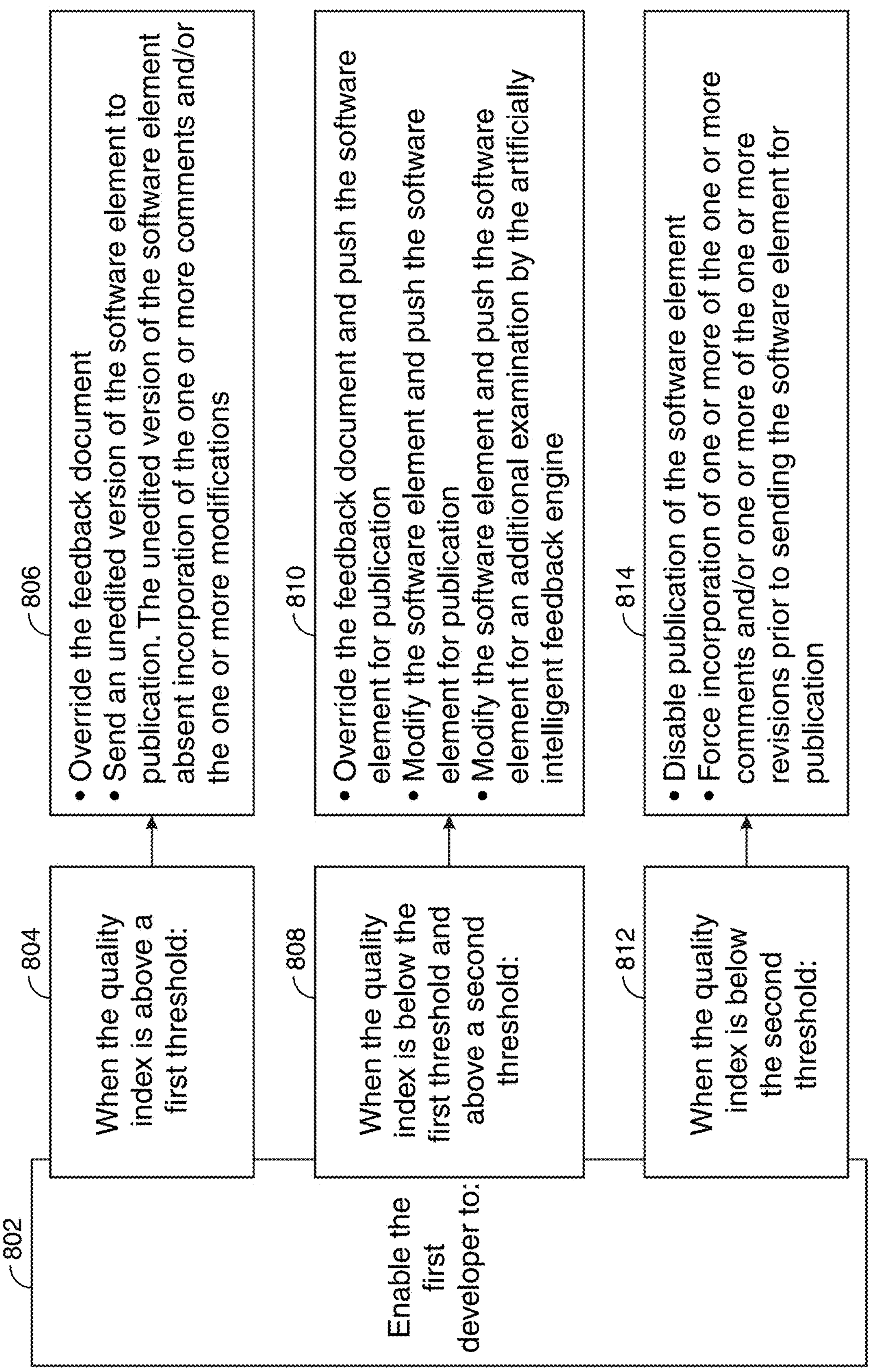
FIG. 8 shows yet another illustrative flow chart in accordance with principles of the disclosure.

FIG. 8 shows an illustrative flow chart. The illustrative flow chart shows following receipt of a feedback document, a first developer is enabled to execute one or more tasks, as shown at 802. The tasks may be enabled based on the value assigned by the LLM to the quantity index.

When the quality index is above a first threshold, as shown at 804, the first developer may override the feedback document, as shown at 806. When the quality index is above a first threshold, as shown at 804, the first developer may send an unedited version of the software element to publication. The unedited version of the software element may be absent incorporation of the one or more comments and/or the one or more modifications.

When the quality index is below the first threshold and above a second threshold, as shown at 808, the first developer may override the feedback document and push the software element for publication, as shown at 810. When the quality index is below the first threshold and above a second threshold, as shown at 808, the first developer may modify the software element and push the software element for publication while bypassing the feedback process, as shown at 810. When the quality index is below the first threshold and above a second threshold, as shown at 808, the first developer may modify the software element and push the software element for an additional assessment by the artificially intelligent feedback engine.

When the quality index is below the second threshold, as shown at 812, the artificially intelligent engine, the user interface and/or any other suitable system element may disable publication of the software element. When the quality index is below the second threshold, as shown at 812, the artificially intelligent engine, the user interface and/or any other suitable system element may force incorporation of one or more of the one or more comments and/or one or more revisions prior to enabling sending the software element for publication. At times, such an incorporation may be performed by the artificially-intelligent engine absent intervention from the developer. Once a quality index of the software element is above the first or second threshold, the software element may be pushed to publication.

Thus, systems and methods for a generative artificial intelligence for development task feedback system are provided. Persons skilled in the art will appreciate that the present invention can be practiced by other than the described embodiments, which are presented for purposes of illustration rather than of limitation. The present invention is limited only by the claims that follow.

What is claimed is:

1. A method for harnessing generative artificial intelligence ("GenAI") to provide dynamic feedback to developers, the method comprising:

receiving a plurality of processed data elements, each processed data element, included in the plurality of the processed data elements, comprising two or more iterations of:
 a software element generated by a developer; and
 a feedback document generated by a tester in response to receiving the software element;
training a large language model with the plurality of processed data elements, said large language model operating in tandem with an artificially intelligent feedback engine;
enabling a first developer to create a software element;
pushing the software element to an artificially intelligent feedback engine;
assessing the software element at the artificially intelligent feedback engine, said assessing comprising using the large language model operating in tandem with the artificially intelligent feedback engine to generate a feedback document for the software element, said feedback document comprising:
 one or more comments on the software element;
 one or more modifications for the software element; and
 a quality index for the software element;
providing the feedback document to the first developer;
when the quality index is above a first threshold, enabling the first developer to:
 override the feedback document; and
 send an unedited version of the software element to publication, said unedited version of the software element absent incorporation of the one or more comments and/or the one or more modifications;
 when the quality index is below the first threshold and above a second threshold enabling the first developer to:
 override the feedback document and push the software element for publication;
 modify the software element and push the software element for publication; and
 modify the software element and push the software element for an additional assessment by the artificially intelligent feedback engine;

when the quality index is below the second threshold:
disabling publishing the software element; and
forcing incorporation of one or more of the one or more comments and/or one or more of the one or more revisions prior to sending the software element for publication.

2. The method of claim 1 wherein the software element is a story, said story comprising a paragraph that identifies a functional or technical description of a system behavior.

3. The method of claim 1 wherein the software element is a code segment.

4. The method of claim 1 wherein the software element is a test case.

5. The method of claim 1, wherein the method further comprises:
continually harvesting updates to various correspondence between different entity levels regarding issues with publication of the software elements; and
continually updating the large language model with the updates.

6. A system for harnessing generating artificial intelligence ("GenAI") to provide dynamic feedback to developers, the system comprising:
a hardware processor comprising an artificially intelligent engine operating in tandem with a large language model, said large language model trained on:
a plurality of processed data elements, each processed data element, included in the plurality of processed data elements comprising two or more iterations of:
a software element generated by a developer; and
a feedback document generated by a tester in response to receiving the software element;
a software development user interface, said software development user interface enabling a developer to:
create a software element;
send a software element for review; and
publish the software element;
the artificially intelligent feedback engine operable to:
intercept a software element sent for review;
assess the software element using the large language model to generate a feedback document for the software element;
provide the feedback document to the developer via the software development user interface, said feedback document comprising:
one or more comments on the software element;
one or more modifications for the software element; and
a quality index for the software element;
upon receipt of the feedback document at the software development user interface, enable the first developer to:
when the quality index is above a first threshold:
override the feedback document; and
send an unedited version of the software element to publication, said unedited version of the software element absent incorporation of the one or more comments and/or the one or more modifications;
when the quality index is below the first threshold and above a second threshold:
override the feedback document and push the software element for publication;
modify the software element and push the software element for publication; and
modify the software element and push the software element for an additional assessment by the artificially intelligent feedback engine;
when the quality index is below the second threshold:
disable publishing the software element; and
force incorporating one or more of the one or more comments and/or one or more of the one or more revisions prior sending the software element for publication.

7. The system of claim 6 wherein the software element is a story, said story comprising a paragraph that identifies a functional or technical description of a system behavior.

8. The system of claim 6 wherein the software element is a code segment.

9. The system of claim 6 wherein the software element is a test case.

10. The system of claim 6, wherein the artificially intelligent engine:
continually harvests updates to various correspondence between different entity levels regarding issues with publication of the software elements; and
continually updates the large language model with the updates.

11. One or more non-transitory computer-readable media storing computer-executable instructions which, when executed by a processor on a computer system, perform a method for harnessing generating artificial intelligence ("GenAI") to provide dynamic feedback to developers, the method comprising:
receiving a plurality of processed data elements, each processed data element, included in the plurality of the processed data elements, comprising two or more iterations of:
a software element generated by a developer; and
a feedback document generated by a tester in response to receiving the software element;
training a large language model with the plurality of processed data elements, said large language model operating in tandem with an artificially intelligent feedback engine;
enabling a first developer to create a software element;
pushing the software element to an artificially intelligent feedback engine;
assessing the software element at the artificially intelligent feedback engine, said assessing comprising using the large language model operating in tandem with the artificially intelligent feedback engine to generate a feedback document for the software element, said feedback document comprising:
one or more comments on the software element;
one or more modifications for the software element; and
a quality index for the software element;
providing the feedback document to the first developer;
enabling the first developer to:
when the quality index is above a first threshold:
override the feedback document; and
send an unedited version of the software element to publication, said unedited version of the software element absent incorporation of the one or more comments and/or the one or more modifications;
when the quality index is below the first threshold and above a second threshold enabling the first developer to:
override the feedback document and push the software element for publication;
modify the software element and push the software element for publication; and modify the software element and push the software element for an additional assessment by the artificially intelligent feedback engine;

when the quality index is below the second threshold:

disable publishing the software element; and force incorporation of one or more of the one or more comments and/or one or more of the one or more revisions prior to sending the software element for publication.

12. The non-transitory computer-readable media of claim 11 wherein the software element is a story, said story comprising a paragraph that identifies a functional or technical description of a system behavior.

13. The non-transitory computer-readable media of claim 11 wherein the software element is a code segment.

14. The non-transitory computer-readable media of claim 11 wherein the software element is a test case.

15. The non-transitory computer-readable media of claim 11, wherein the method further comprises:

continually harvesting updates to various correspondence between different entity levels regarding issues with publication of the software elements; and continually updating the large language model with the updates.

* * * * *